Figure 1:
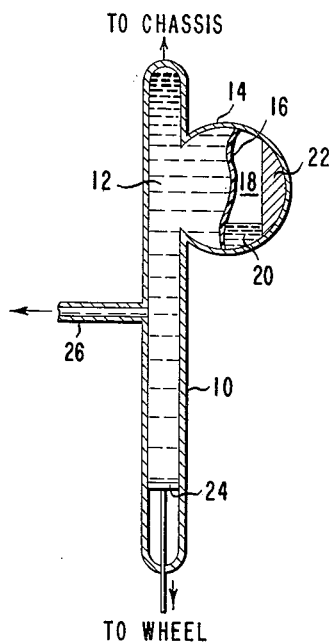

Sept. 12, 1961  B. J. EISEMAN, JR  2,999,680
PNEUMATIC SPRING SUSPENSION
Filed Feb. 24, 1959  2 Sheets-Sheet 1

INVENTOR
BERNHARDT J. EISEMAN, JR.

BY Edwin C. Woodhouse
ATTORNEY

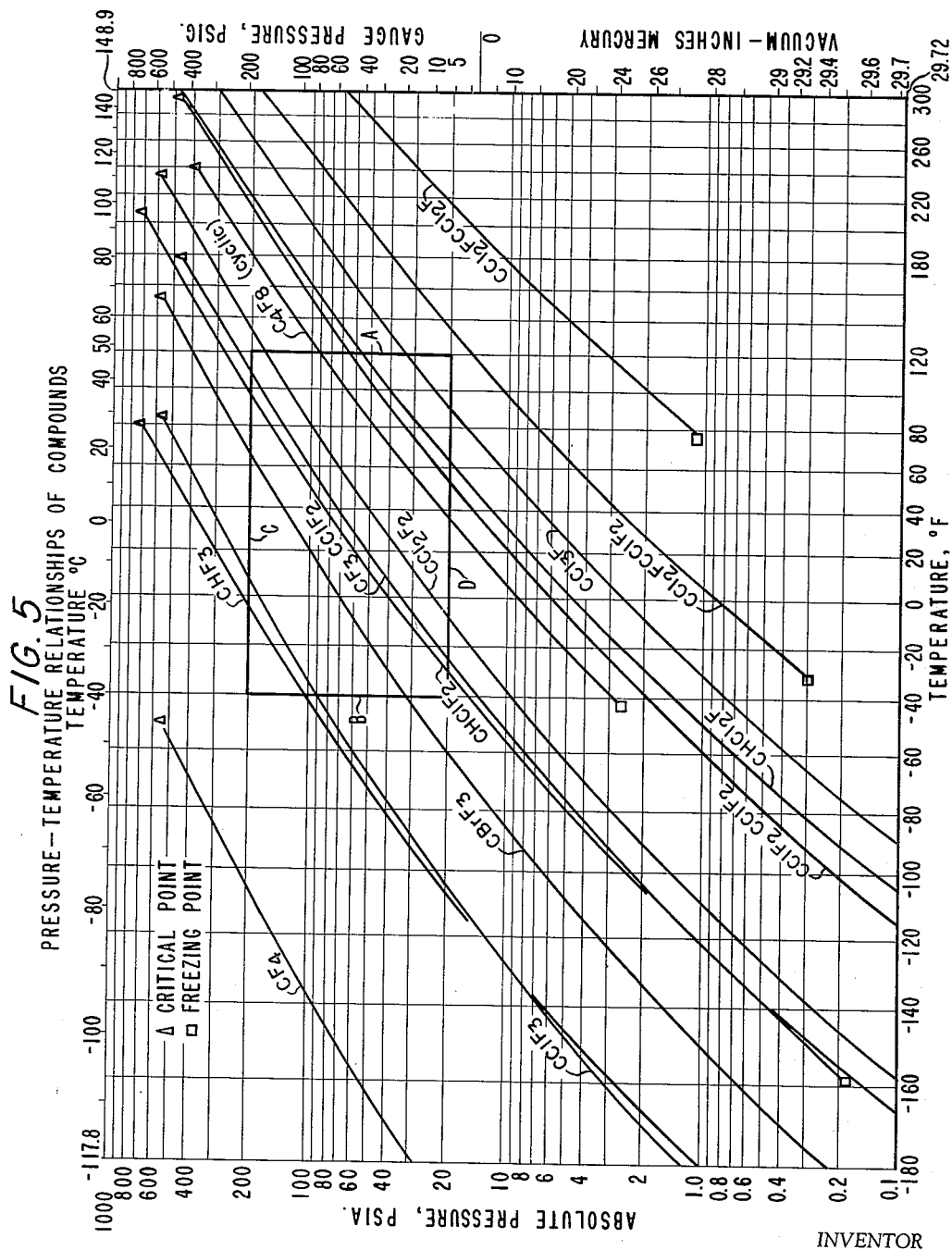

2,999,680
PNEUMATIC SPRING SUSPENSION
Bernhardt J. Eiseman, Jr., Wilmington, Del., assignor to E. I. du Pont de Nemours and Company, Wilmington, Del., a corporation of Delaware
Filed Feb. 24, 1959, Ser. No. 795,142
10 Claims. (Cl. 267—64)

This invention relates to the resilient suspension of loads by means of pneumatic springs and particularly to means and methods for achieving improved softness in such suspension.

The use of pneumatic springs for the resilient suspension of loads is old in the art as illustrated by Alsop in Patent No. 24,184 patented May 31, 1859, and Hoagland in Patent No. 32,848 patented July 16, 1861. Modern types of pneumatic springs are described by Fox et al. on pages 40–44 of General Motors Engineering Journal, Vol. 1, No. 2 (September-October 1953), and by Polhemus et al. and Cowin et al. on pages 16–20 and 21–27, respectively, of General Motors Engineering Journal, Vol. 4, No. 3 (July-August-September 1957). Essentially, the pneumatic springs comprise a gas suspension chamber which contains a compressed non-condensable gas, usually air or nitrogen, which resiliently supports the load. The gas suspension chamber conventionally is of the bellows type, illustrated by Fox et al., or of the air chamber and piston type, illustrated by Alsop, Hoagland, Polhemus et al. and Cowin et al. The pneumatic springs also frequently include means for varying the normal gas pressure in the suspension chamber in accord with variation in the load to be supported. One common method for varying the normal gas pressure in the suspension chamber comprises varying the size of said chamber by means of varying amounts of a non-volatile liquid, while maintaining the amount of gas constant, as illustrated by Alsop. Another common method for varying the normal gas pressure in the suspension chamber comprises varying the amount of gas in the chamber while maintaining the normal volume of the chamber substantially constant, as illustrated by Hoagland and Fox et al. Other methods for providing for varying loads are disclosed by Polhemus et al. These methods and means for adjustments to accommodate varying loads are also used to maintain the desired normal gas pressure under varying ambient temperature conditions.

Heretofore, the pneumatic springs have depended upon the compressibility of a gas, which is non-condensable under the conditions of operation of the spring, to support the load. Any liquid, when present, was non-voltaile and served to transmit pressure, to vary the volume of the suspension chamber and/or to provide a damping effect, but did not soften the springing. In most cases, pneumatic springs, when subjected to sudden deflections at high frequencies, tend to operate under predominantly adiabatic conditions (a minor amount of the heat generated by the compression being absorbed and dissipated by the materials of the suspension chamber and the piston) and, when subjected to deflections at low frequencies, tend to operate under predominantly isothermal conditions. Some pneumatic springs are designed for operation under predominantly isothermal conditions. Heat sink materials may be used in gas suspension chambers for absorbing the heat generated by compression of the gas whereby such chambers operate under predominantly isothermal conditions. Heat sink materials are porous masses of materials having high heat capacity and high surface area which masses present low resistance to the flow of gas. Pneumatic springs, in which the gas suspension chambers operate under predominantly isothermal conditions, provide softer suspension than those in which the suspension chamber operates under predominantly adiabatic conditions. Still softer suspension is desirable.

It is an object of this invention to provide improved softness of suspension of loads on pneumatic springs by employing therein a novel working fluid. A particular object is to provide a method for resiliently suspending a load on a pneumatic spring wherein there is maintained a working fluid which is a mixture of a noncondensing gas and a condensing gas which is partially in liquefied state. A further object is to provide a pneumatic spring containing said working fluid. Another object is to provide a novel working fluid for pneumatic springs. Still other objects will appear hereinafter.

The above and other objects may be accomplished in accord with this invention, wherein a load is resiliently suspended on a pneumatic spring which contains a gas suspension chamber, which comprises maintaining under pressure in said suspension chamber a working fluid which consists essentially of a mixture of a condensing gas and a non-condensing gas; the condensing gas consisting of at least one substantially non-toxic, inert compound capable of existing in both the liquid phase and the gaseous phase under the operating conditions of temperature and pressure of said suspension chamber, which condensing gas has a vapor pressure equal to from about 10% to about 90% of the total presure in the suspension chamber at the normal operating pressure level of the suspension chamber and is present in an amount to maintain a liquid pool thereof occupying a minor fraction of the volume of said suspension chamber; and said non-condensing gas consisting of at least one substantially non-toxic, inert gas which by itself is capable of existing in only the gaseous phase under the operating conditions of temperature and pressure of said suspension chamber which non-condensing gas is present in an amount to provide the rest of the total pressure in the suspension chamber.

The employment of said working fluid produces much softer suspension than can be obtained by the use of only a non-condensing gas. When the spring is deflected, at least part of the condensing gas condenses to the liquid state achieving softness, and the liquid evaporates back to the gaseous state when the spring returns to its original position. The extent to which the condensing gas is condensed will depend upon the extent of the deflection of the spring. Extreme deflection under extreme conditions of low temperature and high load may result in all or substantially all of the condensing gas being condensed to the liquid state, whereupon the non-condensing gas will serve to support the load. The pool of liquefied gas further ensures that the mixture of gases will be saturated with the condensing gas under extreme conditions of high temperature and low load and hence that condensation will occur upon deflection of the spring and the desired soft suspension will be obtained under those extreme conditions.

Since at least one of the components of the gaseous mixtures of the invention is a gas other than air, it is apparent that the pneumatic spring must be designed to avoid excesive leakage of the gases to the surrounding atmosphere, i.e. the gas suspension chamber must be a closed chamber or must form part of a closed system. Subject to such consideration, this invention is applicable to the various pneumatic springs known to the art for resiliently suspending loads and protecting the loads from sudden hard shocks, vibrations, etc., particularly to pneumatic springs for vehicles such as motor vehicles, railroad cars, aircraft, and the like. Representative pneumatic springs, to which this invention may be applied, include those disclosed by Alsop, Fox et al. and Polhemus et al., hereinbefore referred to.

Figure 2:
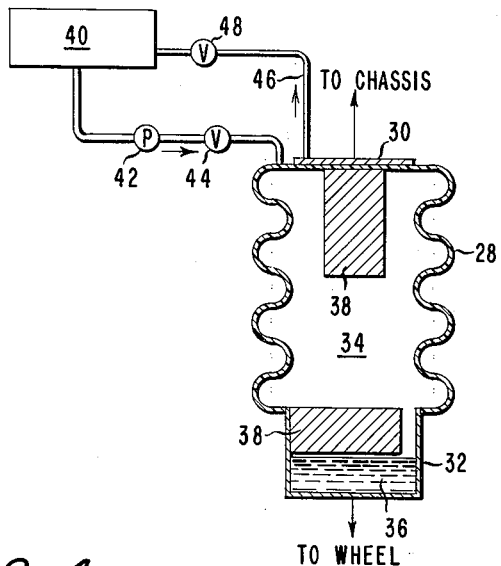
Figure 4:
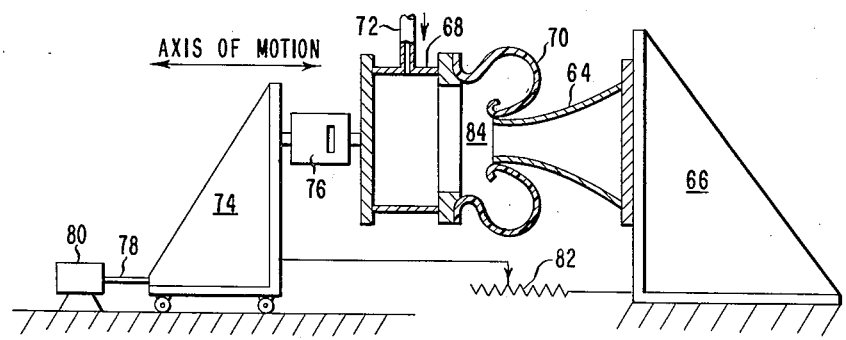
Figure 3:
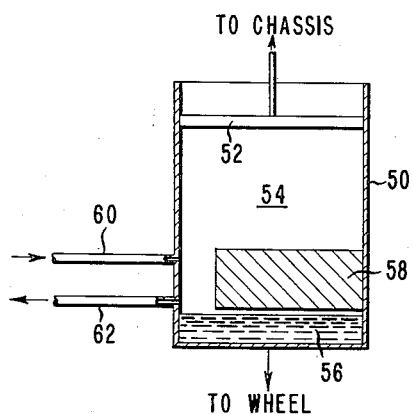

More particularly, various types of suitable pneumatic springs are shown diagrammatically in FIGURES 1 to 4 of the accompanying drawings in which FIGURE 1 represents one form of a closed chamber pneumatic spring; FIGURE 2 represents one form of a pneumatic spring of the bellows type; FIGURE 3 represent one form of a piston type pneumatic spring; FIGURE 4 represents another form of pneumatic spring specially mounted for testing various gases and determining their equivalent gamma values in pneumatic springs under various conditions and hence the softness of suspension achieved thereby; and FIGURE 5 illustrates a mode of determining suitable gases for use in this invention from a temperature-pressure chart of representative gases.

Referring particularly to FIGURE 1, the spring comprises a metal cylinder 10 containing a hydraulic fluid 12, such as oil or water, and a metal vessel 14 having a flexible diaphragm 16 which is made of an oil and gas resistant material, such as an elastomer or plastic, and which forms a closed gas chamber 18. The gas chamber 18 contains the working gas mixture under pressure and a small pool 20 of liquefied condensing gas. Preferably, the gas chamber will contain a suitable heat sink material 22, but such material may be omitted if desired. The upper end of the cylinder 10 is closed and is connected to the load to be suspended, such as the chassis of a vehicle (not shown). The lower end of the cylinder 10 is closed by a piston 24 which is connected to a wheel, axle or other supporting member (not shown). The cylinder 10 is also provided with a line 26 connecting the cylinder with a suitable source of hydraulic fluid under pressure, such as a conventional hydraulic pump (not shown), and, if desired, conventional leveling valves.

In operation, the hydraulic fluid is placed under pressure sufficient to support the load. That pressure is transmitted to the gas in gas chamber 18. Any sudden shock or force applied to the piston will be transmitted through the hydraulic fluid to the diaphragm 16 and cause compression of the gas in the gas chamber, providing the springing action.

Referring particularly to FIGURE 2, the spring comprises a bellows 28 made of a flexible material, such as an elastomer or plastic, provided at the top with a metal disc 30 for connection to the load to be suspended and at the bottom with a metal cup or "bell" 32 which is to be attached to a supporting member such as the wheel or axle of the vehicle, defining a gas suspension chamber 34. The gas chamber will contain the working gas mixture and a small pool 36 of liquefied condensing gas. A porous heat sink material may be included in the gas chamber as indicated at 38. Preferably, the gas chamber will be connected with a gas storage tank 40 through a conventional compressor or pump 42 and a conventional leveling valve 44, and also through line 46 and leveling valve 48.

In operation, the gas suspension chamber will be filled with the working gas mixture at a pressure corresponding to the normal operating pressure level dictated by the load to be suspended. Conventionally, the compressor and leveling valve 44 will be operated to add gas mixture from the storage tank and increase the pressure with increase in the load and leveling valve 48 will discharge gas mixture to the storage tank with decrease in the load, all in the manner well known to the art, so as to maintain a substantially constant curb-standing height. Sudden shocks or forces applied to the bottom of the spring will compress the gas mixture and cause partial condensation of the condensing gas, which condensed gas will evaporate upon release of the compressing force, thereby providing the desired springing action.

Referring to FIGURE 3, the spring comprises a metal cylinder 50 which is connected to a wheel, axle or other support and a metal piston 52 which is connected to the chassis of a vehicle or other load to be suspended, the cylinder and piston defining a gas suspension chamber 54. The gas chamber will contain the working gas mixture under pressure and a small pool 56 of liquefied condensing gas. The gas chamber may, and preferably will, also contain a porous heat sink material indicated at 58. Also, preferably, the gas suspension chamber will be connected through lines 60 and 62 to a storage tank for a supply of working gas mixture through leveling valves and a compressor or pump similar to those shown in FIGURE 2. The operation of this spring will be similar to that of FIGURE 2.

FIGURE 4 shows a pneumatic spring which comprises a stationary metal end bell 64, attached to the stationary support bracket 66, and a movable metal end bell 68 joined by a flexible elastomer casing 70, said bells and casing forming a closed gas suspension chamber 84. The movable end bell 68 is provided with a gas inlet 72 for introducing the desired working gas into the gas chamber under the desired normal operating pressure. The bell 68 is connected to a movable support bracket 74 through a load transducer 76. The bracket 74 is connected to the piston 78 of a hydraulic cylinder 80 which is designed to reciprocate the piston, bracket 74 and bell 68 through various controlled distances at various controlled frequencies. The bracket 74 is also connected to a motion (or position) transducer 82.

In operation, the gas suspension chamber is loaded with the working gas to the desired normal operating pressure level. The hydraulic cylinder and piston is then operated to reciprocate (deflect) bell 68 along its axis for a predetermined distance at a predetermined frequency. During this operation, the load transducer 76 supplies a voltage proportional to the load on the spring, and this load signal is applied to the vertical plates of an oscilloscope. At the same time, the motion transducer supplies a voltage proportional to the deflection of the bell 68, and this motion signal is applied to the horizontal plates of the oscilloscope. These two signals result in a load-deflection curve. Simultaneously, a voltage from a pressure transducer (not shown), proportional to the pressure, is applied to the horizontal plates of a second beam of the oscilloscope, which, in conjunction with the load signal in the vertical plates, give a load-pressure curve for the spring. By photographing the traces of these curves on the oscilloscope screen, permanent records were obtained from which slopes and other values could be read off. The oscilloscope is a well known instrument and the necessary electrical connections will be obvious to one skilled in the art, form no part of this invention, and are not shown in the drawings.

The pneumatic springs may operate under predominantly adiabatic conditions. However, softer suspension is obtained by those pneumatic springs which are designed to operate under predominantly isothermal conditions, as when they contain an effective heat sink material. Suitable heat sink materials include natural fibers, such as wool and cotton; synthetic organic fibers such as rayon, nylon, acrylic fiber, polyester fiber, and the like; metallic wools and porous metallic masses, such as steel wool, aluminum wool, porous or granular masses of iron, steel, copper, aluminum, and the like; and non-metallic inorganic materials in highly porous, granular or fibrous form such as charcoal, alumina, silica, clay, ceramics, fritted glass, glass wool, asbestos, rock wool and the like.

It is recognized in the art that softness of springing or suspension in pneumatic springs is related to the gamma value ($\gamma$) of the gas, where $\gamma$ is the coefficient in the equation $$PV^\gamma = \text{a constant}$$

in which P is the absolute gas pressure and V is the gas volume. Lower gamma values provide softer suspension, and therefore it has been the goal to achieve a system wherein the gamma value is as close to unity as possible. A perfect gas in a spring operating under perfect isothermal conditions will have a gamma value of 1. However, such conditions cannot be obtained in practice, whereby the actual operation of the spring will be intermediate between isothermal and adiabatic conditions, that is, it may be considered to be isothermal in some proportion and adiabatic in the other proportion. Thus, in actual operation, a non-condensable gas, employed by itself, can never have a gamma value as low as 1.

Where condensation occurs, an equation of the form $PV^\gamma=$ constant may not apply. In the latter case, the gas or mixture of gases will exhibit an "equivalent" gamma value, $\gamma'$, which is expressed by the relation $P_1V_1^{\gamma'}=P_2V_2^{\gamma'}$, where $P_1$ and $V_1$ are the absolute pressure and the volume of the gas in the pneumatic spring at one displacement and $P_2$ and $V_2$ are the absolute pressure and the volume at another displacement, resulting from a change in deflection of the spring.

The mixtures of gases employed in the present invention have lowered equivalent gamma values, usually an equivalent gamma value below 1, particularly when the normal gamma value of both the non-condensing gaseous component and the condensing gaseous component is below 1.5. The gamma value ($\gamma$) of a gas is equal to the ratio of its specific heat at constant pressure to its specific heat at constant volume under adiabatic conditions, which is expressed by the equation $$\gamma = \frac{C_p}{C_v}$$

wherein $C_p$ is the heat capacity at constant pressure and $C_v$ is the heat capacity at constant volume. The "normal gamma value," as herein employed, is the gamma value at atmospheric pressure and approximately room temperature, i.e. in the range of about 59° F. (15° C.) to about 86° F. (30° C.). The lowest equivalent gamma value and maximum softness of suspension, with the gaseous mixtures of this invention, will be obtained when the mixture consists of those gases which individually have the lowest normal gamma values. The selection of those gases having low normal gamma values is particularly valuable for springs which operate under predominantly adiabatic conditions, but is also preferred for springs operating under predominantly isothermal conditions. In order to ensure equivalent gamma values below 1, it is preferred that the non-condensing gas be one that has a normal gamma value below 1.5, particularly about 1.4 or below.

Pneumatic springs are used mostly for the suspension of motor vehicles, railroad cars and like vehicles in which the gas suspension chamber of the spring is subjected to varying temperatures within the range of from −70° F. to about 180° F. The normal operating pressure level in the gas suspension chamber will be that required to support the weight of that portion of the vehicle and of the load carried by the vehicle, which is variable, which is suspended by the spring. The minimum pressure level is that required to support the vehicle when empty and the maximum pressure level is that required to support both the vehicle and the load therein when the vehicle is loaded to its capacity. The non-condensing gas must be one which, by itself, is capable of existing in only the gaseous phase under the operating conditions of temperature and pressure of the suspension chamber. The term "by itself" means in the absence of the condensing gas and of any liquid in which the non-condensing gas may be soluble since dissolved non-condensing gas may not be considered to be in the gaseous phase. The condensing gas must be a compound which is capable of existing in both the liquid phase and the gaseous phase under operating conditions of temperature and pressure of the suspension chamber, that is it must be capable of existing in both phases over the ranges of temperature and pressure to which the suspension chamber will be subjected during normal operation of the vehicle or other device in which the spring is used.

The condensing gas must be a compound which has a vapor pressure equal to from about 10% to about 90%, preferably from about 20% to about 80%, of the total pressure in the suspension chamber at the normal operating pressure level of the suspension chamber and must be used with a non-condensing gas sufficient in amount to provide the rest of said total pressure, i.e. to provide that part of the total pressure which is in excess of that provided by the condensing gas. If a condensing gas (having a vapor pressure equal to the total pressure required) is used without the non-condensing gas, it may be completely or substantially completely condensed to a liquid under unexpectedly low temperature and/or high pressure conditions or under miminmum temperature and maximum pressure conditions whereby there will be no or substantially no gas effective to resiliently support the load and the suspension provided by the liquid will be very hard. Accordingly, a non-condensing gas, sufficient to provide at least 10% of the total pressure at the normal operating pressure level of the suspension chamber, must be used with the condensing gas to maintain a volume of gas sufficient to provide effective resilient support of the load in the event of complete or substantially complete condensation of the condensing gas.

Also, the vapor pressure of the condensing gas must be equal to at least about 10%, preferably 20% or more, of the total pressure at the normal operating pressure level of the suspension chamber in order to exert a significant softening effect on the suspension, particularly a softening effect sufficient to justify the practical use of the mixture over the use of the relatively cheap non-condensing gases, such as air, alone. The condensing gas must be present in an amount to provide and maintain a small pool or reservoir thereof in liquefied state under all normal operating conditions so as to maintain the vapor pressure of the condensing gas and to ensure partial condensation upon deflection and hence to provide the desired soft suspension under said conditions. Said pool of liquefied gas should occupy only a minor fraction of the volume of the suspension chamber, and preferably should approach as closely as possible the minimum required to provide liquefied gas at the maximum temperature and minimum pressure of normal operation.

A convenient method for determining the gases which may be used for any particular pneumatic spring is by the use of a pressure-temperature chart of the candidate gases and compounds, as illustrated in FIGURE 5 of the drawings which discloses the pressure-temperature relationships of representative gases. In such method, four lines are drawn to block out a rectangular area corresponding to the predetermined normal conditions under which the spring is to be operated; lines A and B representing the maximum and minimum temperature conditions and lines C and D representing the maximum and minimum pressure conditions. Any gas, whose vapor pressure curve lies to the left of the rectangular area, e.g. $CF_4$, will function as a non-condensing gas in said spring. Vapor pressure curves terminate at the critical points, and a gas will never condense at a temperature above its critical temperature.

Any gas or compound, whose vapor pressure curve passes through some portion of the rectangular area may be used as the condensing gas in said spring under the conditions delineated by that portion of its vapor pressure curve which falls within said area. Thus, in a pneumatic spring having a suspension chamber normally operating under conditions within the ranges illustrated in FIGURE 5, i.e. at temperatures within the range of −40° F. to 120° F. and under pressures within the range of 20 to 200 p.s.i.a. (pounds per square inch absolute), each of $CHF_3$, $CClF_3$, $CBrF_3$, $CHClF_2$, $CF_3CClF_2$, $CCl_2F_2$, $C_4F_8$ (perfluorocyclobutane), $CClF_2CClF_2$, $CHCl_2F$ and $CCl_3F$ will be condensable gases capable of existing in both the liquid phase and the gaseous phase under said operating conditions, and all, except $CCl_3F$, will have a vapor pressure in the range of from 10% to 90% of the total pressure in the suspension chamber at the normal operating pressure level of said chamber. It will be understood that FIGURE 5 is merely illustrative and that pneumatic springs may be operated under other conditions, particularly under higher minimum and maximum pressures, which will be delineated by different rectangular areas.

While mixtures of the various condensing and non-condensing gases and compounds, which meet the requirements hereinbefore set forth, will be operable to provide softened suspension under predominantly isothermal conditions, the choice of the gases and compounds to be used will also depend, in part, upon other practical considerations. Each of the gaseous components should be substantially non-toxic so that accidental leakage of the gases into the atmosphere will not present a serious health hazard. Thus, highly toxic gases, such as HCN, $H_2S$, $(CN)_2$, and $Cl_2$, should not be used.

Also, each of the gaseous components should be substantially inert. That is, under the conditions involved, they should not be significantly corrosive to the materials of the pneumatic spring; should not significantly affect the elastomer components of the spring such as causing excessive swelling of the elastomers or excessive extraction of the elastomers and of ingredients of the elastomers; should not readily react with other members of the mixture; and should not readily decompose or polymerize. For example, highly corrosive or reactive gases, such as HCl, HBr, HF, $F_2$, $Cl_2$ and the like, should not be used.

In addition, while flammable gases may be used and are included within the scope of this invention, it is preferred that the mixture of gaseous components be non-flammable, and particularly that each member of the mixture be non-flammable. For example, if it is desired to use a flammable gas or compound, the mixture may be rendered non-flammable by also including a gas or compound which is non-flammable and will inhibit combustion, such as a highly halogenated compound, particularly one which contains fluorine, bromine or both.

The gases and compounds, conveniently, may be divided into three general groups according to their normal boiling points, i.e. at 760 mm. of mercury (atmospheric pressure). These groups of gases and compounds comprise (1) those which have a normal boiling point below −180° F., which gases will be non-condensing gases under the usual operating conditions of most practical springs; (2) those which have a normal boiling point of from −180° F. to about −40° F., which gases may be non-condensing gases or condensing gases depending upon the conditions of temperature and pressure under which the spring is operated; and (3) those which have a normal boiling point of from about −40° F. to about +120° F., which gases or compounds will be condensing gases under the operating conditions of most practical springs. Preferably, the condensing gases will be selected from those compounds which have a normal boiling point within the range of from about −120° F. to about 40° F.

Representative examples of some practical non-condensing gases of group 1 above are nitrogen, air, oxygen, argon, helium, krypton, neon, hydrogen, carbon monoxide, methane and tetrafluoromethane. These and other gases of this group are disclosed in the examples given hereinafter, particularly in Example 5. Mixtures of any two or more of these gases may be used as the non-condensing gas component of the mixtures of this invention. The monatomic gases have normal gamma values of 1.6 or above and are less desirable except as minor ingredients of mixtures of non-condensing gases which mixtures have materially lower normal gamma values. The use in this invention of those gases of this group and those mixtures thereof, which have normal gamma values below 1.5, will result in materially softer springing and will be preferred. Tetrafluoromethane ($\gamma=1.2$) and methane ($\gamma=1.31$) will provide the softest springing. Because of their low cost, air or nitrogen, particularly air, will frequently be preferred in practice.

Representative members of the gases of group 2, with the approximate normal gamma values of some of them indicated in parentheses, include ethane (1.22), methyl chloride (1.28), ethylene (1.25), monofluoromethane, nitrous oxide (1.3), propane (1.13), propylene, chlorotrifluoromethane (1.17), trifluoromethane, bromotrifluoromethane (1.14), and chlorodifluoromethane (1.18). These gases and many other members of this group, together with their respective normal boiling points, are disclosed in the examples given hereinafter, particularly in Examples 4, 6, 7 and 8. These gases can be used as non-condensing gases in low pressure springs either alone, admixed with one or more other members of this group, or admixed with one or more members of group 1. Also, these gases can be used as condensing gases in high pressure springs either alone, admixed with one or more other members of this group, or admixed with one or more members of group 3. Those having the lower normal gamma values, particularly values below 1.2, are especially valuable where it is desired to obtain maximum softness of suspension.

Representative members of group 3, with the approximate normal gamma values of some of them indicated in parentheses, include ammonia (1.31), n-butane (1.1), isobutane (1.11), ethyl chloride (1.19), dimethyl ether (1.11), diethyl ether (1.08), methyl formate, methyllal (1.11), pentane (1.09), isopentane (1.09), sulfur dioxide (1.29), cyclopropane, bromochlorodifluoromethane, dibromodichloromethane, dichlorodifluoromethane (1.137), trichlofluoromethane (1.136), dichlorofluoromethane (1.175), 1,1,2-trichlorotrifluoroethane (1.08), 1,2-dichlorotetrafluoroethane (1.088), chloropentafluoroethane (1.09), perfluoroethane, and perfluoropropane. These and many other members of this group, together with their normal boiling points, are disclosed in the examples given hereinafter, particularly in Example 8. The compounds of this group can be used as condensing gases either alone, admixed with one or more other members of this group, or admixed with one or more members of group 2 which are condensable under the operating conditions of the particular spring. Mixtures of condensing gases of different vapor pressures are particularly valuable to give a vapor pressure (the combined partial pressures of the members of the mixture) which cannot be obtained conveniently by a single member. Such mixtures may also exhibit more moderate changes in vapor pressure with changes in temperature than a single condensing gas, and have very definite advantages in springs which are to be operated under varying temperature conditions.

In pneumatic springs in which the suspension chamber operates under predominantly adiabatic conditions, it is particularly important that the non-condensing gas component (whether a single gas or a mixture of gases) have a low normal gamma value, i.e. below 1.5, preferably below 1.3, because such gases will yield softer suspension and will exhibit lower work of compression. Also, in such springs, each member of the condensing gas component should be condensable under adiabatic compression. Some of the compounds which are known to be adiabatically condensable are $CCl_2FCClF_2$, $CClF_2CClF_2$, $CClF_2CF_3$, $CF_3CF_2CF_3$, $CH_3CH_2CH_2CH_3$ and $(CH_3)_3CH$. These and other adiabatically condensable compounds are listed in the examples. Such adiabatically condensable compounds also have definite advantages as members of the condensable gas components in springs in which the suspension chamber operates under predominantly isothermal conditions.

Of the gases and compounds of groups 2 and 3 described hereinbefore, the saturated aliphatic compounds are preferred, particularly for use as the condensing gases. By "saturated aliphatic compounds" is meant those which are free of unsaturated carbon-carbon bonds and of aromatic rings. These compounds include both cycloaliphatic (e.g. cyclopropane, perfluorocyclopropane, cyclobutane, perfluorocyclobutane, and chloroperfluorocyclobutane) and acyclic compounds. Also included are hydrocarbons, ethers and their halogenated derivatives.

Polyhalogenated saturated aliphatic hydrocarbons of 1 to 4 carbon atoms in which each halogen atom has an atomic weight of less than 81, are particularly desirable. These compounds have at least 2 of their hydrogen atoms replaced by halogen atoms selected from fluorine, chlorine and bromine. More desirably, at least one of the halogen atoms, preferably at least 50% of them, should be fluorine atoms. Under the conditions involved, such polyhalogenated compounds, particularly the highly fluorinated compounds, are highly stable, non-corrosive, resistant to reaction, and non-flammable, usually inhibiting combustion. Also, as shown, they generally have low normal gamma values. Particularly preferred members of this class are $CCl_2F_2$, $CHClF_2$, $CF_3CClF_2$, $CBrF_3$, $CClF_3$, $CHF_3$, $CF_3CF_3$ and $CClF_2CClF_2$.

In order to more clearly illustrate this invention, preferred modes of practicing it, and the advantageous results to be obtained thereby, the following examples are given in which the amounts are by weight except where specifically indicated otherwise:

*Example 1*

A glass syringe of 20 ml. capacity was filled with gaseous 1,2-dichlorotetrafluoroethane ($CClF_2CClF_2$) by removing the piston and blowing the gas through the syringe cylinder upward from the needle end until the air was displaced by the gas. The piston was then inserted, the discharge end of the syringe closed off and pressure applied suddenly to the piston. Liquefaction of a part of the gas occurred. This was easily seen because the translucent ground glass became transparent when wetted with liquid. On allowing the piston to travel outward so that the gas expanded, the liquid vaporized. Such cycles were repeated numerous times in rapid succession. When some air was admixed with the $CClF_2CClF_2$ in the cylinder and the above experiments repeated, partial liquefaction again occurred on compression.

This syringe was connected to a transparent glass pressure test tube of 10 ml. capacity. Liquid $CClF_2CClF_2$ was placed in the test tube, simulating a spring with a pool of liquid, and partially boiled off through the syringe cylinder above it to displace the air. Tests similar to those described above were carried out. Liquefaction occurred on the glass walls. In the transparent glass test tube, mist formation was observed when the gas was compressed. Some of the tests were carried out with a pool of liquid $CClF_2CClF_2$ in the bottom of the test tube and a mixture of air and gaseous $CClF_2CClF_2$ in the syringe and test tube, to illustrate the condensation of one component of a gaseous mixture.

The glass syringe and the glass syringe and test tube combination operate with predominantly adiabatic conditions applying in the interior of the gas, if the compression is very rapid.

*Example 2*

The apparatus of FIGURE 4 of the drawings was employed.

The spring was loaded at room temperature (68° F. to 70° F.) with air or with $CClF_2CClF_2$ (1,2-dichlorotetrafluoroethane) or with mixtures of air and $$CClF_2CClF_2$$

to a pressure of 12 to 13 p.s.i.g. (26.7 to 27.7 p.s.i.a.). The spring was then operated through predetermined deflections of 3 and 5 inches at 3 cycles per minute and at 60 cycles per minute.

The procedure followed was: First the spring was operated filled with air. Then the spring was evacuated, filled with $CClF_2CClF_2$ to 12 to 13 p.s.i.g., and operated. The spring was then bled down to atmospheric pressure, leaving about 15 p.s.i.a. of $CClF_2CClF_2$ in the spring, and the pressure built up to 12 to 13 p.s.i.g. with air, so that almost half the pressure in the spring was due to air. The spring was operated to mix the air and the $$CClF_2CClF_2$$

and tests were run on this mixture No. 1. Next, the spring was again bled down to atmospheric pressure and the pressure again brought up to 12 to 13 p.s.i.g., this time with $CClF_2CClF_2$, so that about one fourth of the pressure was due to air in this No. 2 mixture. After running to accomplish mixing, tests were run on this second mixture. Finally, the $CClF_2CClF_2$ was removed from the spring and replaced with air and further tests were run on air alone.

In this air spring, the diameter varied with the deflection (as is not unusual in air springs). In order that the geometry would be the same, comparisons between air and $CClF_2CClF_2$ and the mixtures were made at the same deflection. The rate of change of load with deflection, or spring rate, is represented by the relation $$R = \frac{\gamma P A^2}{V}$$

in adiabatic compression and expansion, where gamma ($\gamma$) is the adiabatic factor (1.4 for air), P the absolute pressure, A the area of the piston, and V the volume of the gas. At the same deflection, A and V are the same and we may write $$R_a = \frac{\gamma_a P_a A^2}{V}$$

for an air run, where $a$ is air, and $$R_g = \frac{\gamma_g P_g A^2}{V}$$

for another gas or a mixture, where $g$ is the other gas or mixture of gases. Taking the ratio of these equations, we have:

$$\gamma_g = \gamma_a \left(\frac{P_a}{P_g}\right)\left(\frac{R_g}{R_a}\right)$$

at a given deflection. The pressures were read off from the photographs of oscillograph traces and the spring rate determined from the slope of the load-deflection traces.

In this way, the following equivalent gamma values for $CClF_2CClF_2$ and mixtures of $CClF_2CClF_2$ with air were determined:

| Gas in spring | Cycles per minute | Deflection, inches | $\gamma'$ value (calc. from air=1.4) | Measured $\gamma_g/\gamma_a$ |
|---|---|---|---|---|
| $CClF_2CClF_2$ | 60 | 3 | 0.84 | 0.60 |
| $CClF_2CClF_2$ | 60 | 5 | 0.72 | 0.51 |
| $CClF_2CClF_2$ | 3 | 5 | 0.57 | |
| Mixture No. 1 | 60 | 3 | 1.05 | 0.75 |
| Do | 60 | 5 | 0.65 | 0.46 |
| Mixture No. 2 | 60 | 3 | 1.00 | 0.71 |
| Do | 60 | 5 | 0.63 | 0.45 |

The equivalent gamma values listed above for $$CClF_2CClF_2$$

and its mixtures with air assume a gamma value for air of 1.4 and thus may be slightly in error. The ratio of the equivalent gamma value for $CClF_2CClF_2$ and its mixtures with air to the equivalent gamma value of air is more accurate since it makes no assumption regarding the actual value for air. This last column shows that the effective equivalent gamma values for the $CClF_2CClF_2$-containing gas went down to less than half that of air in the test spring.

*Example 3*

To illustrate a representative practical mode of applying this invention, 0.24 lb. of $CCl_2F_2$ and 0.05 lb. of nitrogen will be introduced into the 200 cubic inch gas space of each gas spring of a closed gas spring suspension system on an automobile, each spring provided with effective heat sinks, free of excessive gas leakage, and provided with suitable reservoir space for liquefied gas, and designed to operate with a normal working pressure of 170 p.s.i.a. (155 p.s.i.g.). Sufficient liquid $CCl_2F_2$ will be introduced to fill the liquid pool reservoir in each spring. Then, in each spring, when the temperature is 70° F., the partial pressure of the $CCl_2F_2$ will be approximately 85 p.s.i.a. and the nitrogen partial pressure will be approximately 85 p.s.i.a.

When the spring undergoes a deflection such that the gas volume in the spring is halved, the pressure will increase to $2 \times 85 + 85 = 255$ p.s.i.a., so that the equivalent gamma value is: $170 \times 1^{\gamma'} = 255 \times 0.5^{\gamma'}$ or $\gamma' = 0.6$, which is much lower than the gamma value of slightly above one with nitrogen alone in this approximately isothermal system.

It will be found that there is a much softer ride with the mixture than with nitrogen alone or with air alone, air being nearly equivalent in suspension properties to nitrogen.

If the spring is operated at 100° F. and at the same total pressure (despite the change in temperature, the total pressure will be held to the same level by suitable conventional means, such as a valve and compressor system removing gas as the temperature rises and adding gas as the temperature falls, or such as a volume regulating device providing more volume in the spring as the temperature increases and decreasing the volume as the temperature falls), the partial pressure of $CCl_2F_2$ will be about 132 p.s.i.a. and that of air will be about 38 p.s.i.a. When the gas volume is halved by deflection of the spring, the pressure will increase from 170 to 208 p.s.i.a. so that:

$$170 \times 1^{\gamma'} = 208 \times 0.5^{\gamma'}$$

$$\gamma' = 0.3$$

as compared with a gamma of more than 1.0 for nitrogen or air alone.

When deflection of the spring decreases the volume by one-third at this temperature, the pressure will increase from 170 to $132 + 1.5 \times 38 = 189$ p.s.i.a. so that:

$$170 \times 1^{\gamma'} = 189 \times 0.6667^{\gamma'}$$

or $$\gamma' = 0.26$$

or still softer than for the higher compression, as compared to a gamma value of above 1.0 for nitrogen or air alone for a similar deflection and temperature.

When the spring is operated at 32° F., a deflection of the spring which halves the volume will raise the pressure from 170 p.s.i.a. to $45 + 2(170 - 45) = 295$ p.s.i.a. so that:

$$170 \times 1^{\gamma'} = 295 \times 0.5^{\gamma'}$$

or $$\gamma' = 0.8$$

as compared to above 1.0 for nitrogen or air for this temperature and deflection.

*Example 4*

In a manner similar to that described in Example 3, a mixture of nitrogen and a condensable gas of higher vapor pressure will be introduced into gas springs designed for higher normal working pressures or a condensable gas of lower vapor pressure will be used in springs designed for lower normal working pressures. The following gases can be used each in mixture with nitrogen or other non-condensing gas:

| Formula of gas | Vapor pressure at 70° F., p.s.i.a. | Normal boiling point, ° F. | Critical temp., ° F. | Critical pressure, p.s.i.a. |
|---|---|---|---|---|
| $CCl_2FCClF_2$ | 5.5 | 118 | 417 | 495 |
| $CCl_3F$ | 13.4 | 75 | 388 | 635 |
| $CHCl_2F$ | 23.1 | 48 | 353 | 750 |
| $CClF_2CClF_2$ | 27.6 | 38 | 294 | 474 |
| $C_4F_8$ (cyclic) | 40 | 21 | 240 | 393 |
| $CCl_2F_2$ | 84.9 | -22 | 234 | 597 |
| $CClF_2CF_3$ | 118 | -38 | 176 | 453 |
| $CHClF_2$ | 137 | -41 | 205 | 716 |
| $CBrF_3$ | 214 | -72 | 153 | 575 |
| $CClF_3$ | 473 | -115 | 84 | 561 |
| $CHF_3$ | 620 | -116 | 79 | 701 |

The liquefiable gas will be selected so that its vapor pressure provides a large fraction of the normal operating pressure at the average operating temperature of the spring. The larger the proportion of condensable gas employed, with the non-condensing gas component, the softer the springing will be.

*Example 5*

In a manner similar to that described in Examples 3 and 4, chlorodifluoromethane ($CHClF_2$) may be introduced into the springs, but the non-condensing gas component used, instead of being nitrogen, can be one of the non-condensig gases listed below or mixture of these non-condensing gases, which may include nitrogen.

| Gas | Boiling Point, ° F. | Critical Temperature, ° F. | Critical Pressure, p.s.i.a. |
|---|---|---|---|
| $CF_4$ | -198 | -50 | 542 |
| Air | | | |
| $O_2$ | -297 | -181 | 736 |
| A | -303 | -188 | 705 |
| He | -452 | -450 | 33 |
| Kr | -242 | -83 | 798 |
| Ne | -411 | -380 | 395 |
| $H_2$ | -423 | -400 | 188 |
| $CH_4$ | -260 | -116 | 673 |
| $NF_3$ | -184 | | |
| CO | -310 | -220 | 507 |

The preferred non-condensable gases are those which are non-toxic, non-flammable, non-corroding and low in cost. On this basis, nitrogen is particularly attractive. A further factor is that, even with a good heat sink, the functioning will not be completely isothermal. Under adiabatic conditions or conditions intermediate between adiabatic and isothermal, a gas of lower specific heat ratio will lead to softer suspension. On this basis $CF_4$, which is non-toxic, non-flammable and non-corroding, with a ratio of $C_P/C_V$ of 1.2 as compared to 1.4 for nitrogen and above 1.6 for the monatomic gases, is to be preferred.

*Example 6*

In a manner similar to that described in Examples 3, 4 and 5, the gases listed below can be used as the condensable gas component in gas springs which operate at high pressure and/or low temperature, or the non-condensing gas component in gas springs which operate at low pressures and/or high temperatures, the criterion being whether the vapor pressure curve of the gas has a portion falling within the region bounded by the minimum and maximum pressures in the spring and the minimum and maximum operating temperatures. If a portion of the vapor pressure curve does fall in this region, the gas will be condensable, but not otherwise.

Mixtures of these gases with each other and with various other gases may also be used as the condensable gas components, provided that the mixtures have the required vapor-pressure curves.

| Gas | Boiling Point, °F. | Critical Temperature, °F. | Critical Pressure, p.s.i.a. |
|---|---|---|---|
| Xe | −160 | +62 | 852 |
| $CO_2$ | [1] −109 | +88 | 1,071 |
| $SF_6$ | [1] −83 | +114 | 545 |
| $C_3H^6$ | −128 | +90 | 708 |
| $C_2H_4$ | −155 | +50 | 735 |
| $N_2O$ | −126 | +98 | 1,054 |
| $CClF_3$ | −115 | +84 | 561 |
| $CHF_3$ | −116 | +79 | 690 |

[1] Sublimes.

*Example 7*

In a manner similar to that described in Examples 3, 4 and 5, an equimolar mixture of $CClF_3$ $CBrF_3$, $CHClF_2$ and $CCl_2F_2$, operating as the condensable gas component, can be used in gas springs having a good heat sink and with a normal operating pressure of 300 p.s.i.a, in sufficient quantity so that liquefied gas mixture is present, along with a non-condensing gas of Example 5 in sufficient quantity to reach the operating pressure. The effect of a deflection which decreases the volume of the spring by 20% (from 5 volumes to 4 volumes) is shown in the following table, in which the third, fifth and seventh columns show the partial pressures of the individual gases corresponding to their respective mole fractions in the mixture:

| Temp. °F | 20 | | 70 | | 100 | |
|---|---|---|---|---|---|---|
| Mixture | Vapor pressure, p.s.i.a. | ¼ vapor pressure, p.s.i.a. | Vapor pressure, p.s.i.a. | ¼ vapor pressure, p.s.i.a. | Vapor pressure, p.s.i.a. | ⅓ vapor pressure, p.s.i.a. |
| $CClF_3$ | 240 | 60 | 473 | 118 | | |
| $CBrF_3$ | 100 | 25 | 214 | 54 | 315 | 105 |
| $CHClF_2$ | 58 | 14 | 137 | 34 | 212 | 71 |
| $CCl_2F_2$ | 35.5 | 9 | 85 | 21 | 133 | 44 |
| Vapor pressure of liquid mixture (m) | | 108 | | 227 | | 220 |
| Equivalent [1] gamma value | 0.67 | | 0.26 | | 0.29 | |

[1] The equivalent gamma value is calculated from the following relation:

$$300 \times 1\gamma' = [m + 5/4(300-m)] \times 0.8\gamma'$$

This illustrates the way in which a mixture may be used so that there will be only a moderate vapor pressure for the liquid mixture at elevated temperatures. At 100° F., $CClF_3$ is above its critical temperature so that it cannot condense. The vapor pressures of the liquid mixtures are calculated, above, on the assumption that the mixtures are "perfect" solutions, which is only approximately true so that the calculated vapor pressures are only approximate. The actual vapor pressures will be somewhat higher than the estimated values. The actual values will thus constitute a larger fraction of the total value and give somewhat lower equivalent gamma values.

Much softer springing will result from using the condensing gas mixture than from using non-condensing gases alone. The minimum gamma value for the latter will be greater than unity as compared to equivalent gamma values far below unity for the condensing mixture above. Mixtures of these gases in various other proportions and other mixtures of 2 or more condensable gases can be used similarly.

*Example 8*

In a manner similar to that described in Examples 3, 4 and 5, the gases listed below and mixtures of them with each other and with other gases can be used as the condensable gas components in gas springs.

| Gas | Boiling Point, °F. | Critical Temperature, °F. | Critical Pressure, p.s.i.a. |
|---|---|---|---|
| $CBrClF_2$ | 25 | 309 | 595 |
| $CBr_2F_2$ | 76 | 389 | 600 |
| $C_2F_6$ | −109 | 76 | 480 |
| $C_3F_8$ | −35 | 160 | 388 |
| $C_4F_{10}$ | 28 | 236 | 300 |
| $C_5F_{12}$ | 86 | | |
| $NH_3$ | −28 | 270 | 1,636 |
| $CH_3CH_2CH_2CH_3$ | 31 | 306 | 551 |
| $(CH_3)_3CH$ | 14 | 275 | 529 |
| $C_2H_5Cl$ | 54 | 369 | 764 |
| $CH_3Cl$ | −12 | 290 | 968 |
| $C_2H_5F$ | −36 | 216 | 685 |
| $(CH_3)_2O$ | −11 | 260 | 729 |
| $(C_2H_5)_2O$ | 94 | 381 | 523 |
| $CH_3OCOCH_3$ | 89 | 417 | 870 |
| $CH_2(OCH_3)_2$ | 111 | 435 | |
| $CH_3CH_2CH_3$ | −44 | 206 | 617 |
| $CH_3(CH_2)_3CH_3$ | 97 | 386 | 489 |
| $(CH_3)_2CHCH_2CH_3$ | 82 | 370 | 483 |
| $CH_3CH=CH_2$ | −53 | 316 | 1,143 |
| $C_2H_5OCH_3$ | 46 | 329 | 638 |
| $CH_2=CHF$ | −60 | | |
| $CH_3Br$ | 38 | 290 | |
| $CH_2F_2$ | −62 | | |
| $CHBrClF$ | 100 | | |

| Gas | Boiling point, °F. | Gas | Boiling point, °F. |
|---|---|---|---|
| $CH_2BrF$ | 68 | $CHF_2CClF_2$ | 14 |
| $CF_3CBrF_2$ | −8 | $CHClFCF_3$ | 10 |
| $CBrF_2CClF_2$ | 75 | $CHF_2CF_3$ | −55 |
| $CBrF_2CBrF_2$ | 117 | $CH_2ClCClF_2$ | 116 |
| $CHClFCBrF_2$ | 112 | $CHClFCHF_2$ | 63 |
| $CHF_2CBrF_2$ | 35 | $CHCl=CClF$ | 95 |
| $CBrF_2CH_2F$ | 77 | $CHCl=CHCl$ trans | 119 |
| $CH_2BrCF_3$ | 79 | $CH_2=CF_2$ | −119 |
| $CHBrFCHF_2$ | 106 | $CF_3CCl_2CF_3$ | 91 |
| $CH_3CBrF_2$ | 52 | $CF_3CClFCClF_2$ | 93 |
| $CH_3CH_2Br$ | 101 | $CClF_2CF_2CClF_2$ | 96 |
| $C_3BrF_7$ | 54 | $CF_3CF_2CCl_2F$ | 93 |
| $CBrF_2CF_2CHF_2$ | 106 | $CF_3CFClCF_3$ | 28 |
| $C_3HBrF_6$ | 91 | $CF_3CF_2CClF_2$ | 28 |
| $CBrClCF_2$ | 110 | $CHF_2CF_2CClF_2$ | 71 |
| $CH_2Cl_2$ | 104 | $CF_3CF_2CHF_2$ | 1 |
| $CH_2ClF$ | 16 | $CF_3CH_2CClF_2$ | 83 |
| $CCl_3CF_3$ | 114 | $CF_3CH_2CF_3$ | 31 |
| $CCl_2FCF_3$ | 38 | $CHF_2CF_2CHF_2$ | 51 |
| $CHClFCClF_2$ | 82 | $CClF_2CF_2CH_3$ | 68 |
| | | $CF_3CF_2CH_3$ | −3 |
| $CH_2ClCF_3$ | 43 | $CF_3CHClCH_3$ | 86 |
| $CHF_2CHF_2$ | −9 | $CF_3CH_2CH_2Cl$ | 113 |
| $CH_3CCl_2F$ | 90 | $CClF_2CH_2CH_3$ | 76 |
| $CH_3CClF_2$ | 16 | $CF_3CH_2CH_3$ | 9 |
| $CH_2ClCHF_2$ | 95 | $CH_3CClFCH_3$ | 95 |
| $CH_3CF_3$ | −53 | $CH_3CH_2CHClF$ | 117 |
| $CH_2FCHF_2$ | 41 | $CH_2FCHClCH_3$ | 113 |
| $CH_3CHClF$ | 61 | $CHF_2CH_2CH_3$ | 45 |
| $CH_3CHF_2$ | −11 | $CH_3CF_2CH_3$ | 32 |
| $CH_2FCH_2F$ | 50 | $CH_3CHFCH_3$ | 13 |
| $CClF=CClF$ cis | 70 | $CH_2FCH_2CH_3$ | 27 |
| $CClF=CClF$ trans | 72 | $CCl_2FCF=CF_2$ | 117 |
| $CClF_2CCl=CF_2$ | 112 | $CF_3CCl=CClF$ | 117 |
| $CF_3CF=CCl_2$ | 115 | $CF_3CCl=CF_2$ | 44 |
| $ClF_2CF=CF_2$ | 47 | $CF_3CF=CClF$ | 46 |
| $CF_3CF=CF_2$ | −21 | $CF_3CH=CFCl$ | 65 |
| $CF_3CF=CHCl$ | 59 | $CF_3CH=CF_2$ | −6 |
| $CClF_2CF=CH_2$ | 53 | $CF_3CF=CH_2$ | −19 |
| $CH_3CH=CFCl$ | 77 | $CH_3CH=CF_2$ | −20 |
| $CF_2CF_2CF_2CFCl$ | 77 | | |

*Example 9*

Gas springs, without heat sinks, can be loaded with $CClF_2CF_3$ to 13.88 p.s.i.a. at −40° F. On sudden compression to 136.6 p.s.i.a., the following changes will result:

| Conditions | Entropy B.t.u./ (lb.)(° R.) | Pressure p.s.i.a. | Volume cu. ft./ lb. | Temp., ° F. | Quality fraction liquid |
|---|---|---|---|---|---|
| Original | 0.12960 | 13.88 | 2.021 | −40 | 0 |
| Final | [1] 0.12960 | 136.6 | [2] 0.2173 | +80 | 0.108 |

[1] At 136.6 p.s.i.a. and +80° F. the entropy of the liquid is 0.06213 and that of the vapor 0.13770 B.t.u./(lb.) (° R.) referred to the saturated liquid at −40° F. as having zero entropy.
[2] Liquid volume is 0.01249 cu. ft./lb.

The equivalent gamma calculated from the relation $(13.88)(2.021)^{\gamma'} = (136.6)(0.19535)^{\gamma'}$, where 0.19535 is the final volume which is partly vapor and partly liquid, gives a value, equivalent gamma=0.98, which is less than is possible for adiabatic compression without condensation, and thus the springing will be softer than would be possible without condensation.

If a non-condensing gas is included with the condensable $CClF_2CF_3$, lower equivalent gamma values and softer springing will result than can be obtained with the non-condensing gas alone. The various non-condensing gases of the earlier examples can be employed. Also, various other adiabatically condensable gases, including $CClF_2CClF_2$, $CCl_2FCClF_2$, $CH_3CH_2CH_2CH_3$, $(CH_3)_3CH$, and $C_3F_8$, can be substituted for the $CClF_2CF_3$. In each case, where condensation occurs, lower equivalent gamma values and softer springing will result than will be encountered under non-condensing conditions.

It will be understood that the preceding examples and the drawings have been given for illustrative purposes solely and that this invention is not limited to the specific embodiments set forth therein. For example, the types and structural details of the pneumatic springs may be widely varied and they may be employed for any purpose for which a pneumatic spring may be desired. Gases, other than those specifically listed, may be employed and the combinations and mixtures of gases, the relative proportions thereof, and the conditions under which they are employed may be widely varied, subject to the limitations and principles set forth in the general description, without departing from the spirit and scope of this invention.

From all of the foregoing, it is apparent that this invention provides a material improvement in means and methods for resiliently suspended loads and protecting them from shocks, recoils, vibrations, and the like. Particularly, it provides novel working fluids for pneumatic springs whereby softer suspension or springing is achieved than could be obtained heretofore. Pneumatic springs, containing such working fluids, have very valuable improved suspension properties. Therefore, this invention constitutes a valuable advance in the art.

The embodiments of the invention in which an exclusive property or privilege is claimed are defined as follows:

1. A pneumatic load-bearing spring having a gas suspension chamber for a load-supporting gas, said suspension chamber containing under load-induced pressure (1) a condensing gas which consists of at least one substantially non-toxic inert compound capable of existing in both the liquid phase and the gaseous phase under the operating conditions of temperature and pressure of said chamber, which condensing gas has a vapor pressure equal to from about 10% to about 90% of the total pressure at the normal operating pressure level of said chamber; (2) a non-condensing gas which consists of at least one substantially, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

2. A pneumatic load-bearing spring having a gas suspension chamber for a load-supporting gas, said suspension chamber containing under load-induced pressure (1) a condensing gas which consists of at least one substantially non-toxic inert saturated aliphatic compound having a normal boiling point within the range of from −180° F. to about 120° F. and which is capable of existing in both the liquid phase and the gaseous phase under the operating conditions of temperature and pressure of said chamber, which condensing gas has a vapor pressure equal to from about 10% to about 90% of the total pressure at the normal operating pressure level of said chamber; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

3. A pneumatic load-bearing spring having a gas suspension chamber for a load-supporting gas, said suspension chamber containing under load-induced pressure (1) a condensing gas which consists of at least one substantially non-toxic inert saturated aliphatic compound having a normal gamma value below 1.4 and a normal boiling point within the range of from about −120° F. to about 40° F. and which is capable of existing in both the liquid phase and the gaseous phase under the operating conditions of temperature and pressure of said chamber, which condensing gas has a vapor pressure equal to from about 20% to about 80% of the total pressure at the normal operating pressure level of said chamber; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

4. A pneumatic load-bearing spring having a gas suspension chamber for a load-supporting gas, said suspension chamber containing under load-induced pressure (1) a condensing gas which consists of at least one substantially non-toxic inert polyhalogenated saturated aliphatic hydrocarbon of 1–4 carbon atoms in which each halogen atom has an atomic weight of less than 81 and at least one is fluorine and which has a normal boiling point within the range of from −180° F. to about 120° F. and which is capable of existing in both the liquid phase and the gaseous phase under the operating conditions of temperature and pressure of said chamber and which condensing gas has a vapor pressure equal to from about 10% to about 90% of the total pressure at the normal operating pressure level of said chamber; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

5. A pneumatic load-bearing spring having a gas suspension chamber for a load-supporting gas, said suspension chamber containing under load-induced pressure (1) a condensing gas which consists of at least one substantially non-toxic inert polyhalogenated saturated aliphatic hydrocarbon of 1–4 carbon atoms in which each halogen atom has an atomic weight of less than 81 and at least one is fluorine and which has a normal gamma value below 1.4 and a normal boiling point within the range of from about −120° F. to about 40° F. and is capable of existing in both the liquid phase and the gaseous phase under the operating conditions of temperature and pressure of said chamber and which condensing gas has a vapor pressure equal to from about 20% to about 80% of the total pressure at the normal operating pressure level of said chamber; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

6. A pneumatic load-bearing spring having a gas suspension chamber for a load-supporting gas and which is designed to operate under predominantly adiabatic conditions, said suspension chamber containing under load-induced pressure (1) a condensing gas which consists of at least one substantially non-toxic inert saturated aliphatic compound having a normal boiling point within the range of from −180° F. to about 120° F. and which is capable of existing in both the liquid phase and the gaseous phase under the operating conditions of temperature and pressure of said chamber, which condensing gas has a vapor pressure equal to from about 10% to about 90% of the total pressure at the normal operating pressure level of said chamber and is condensable under adiabatic compression; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

7. A pneumatic load-bearing spring having a gas suspension chamber for a load-supporting gas and which contains a heat sink material which causes said chamber to operate under predominantly isothermal conditions, said suspension chamber containing under load-induced pressure (1) a condensing gas which consists of at least one substantially non-toxic inert saturated aliphatic compound having a normal boiling point within the range of from −180° F. to about 120° F. and which is capable of existing in both the liquid phase and the gaseous phase under the operating conditions of temperature and pressure of said chamber, which condensing gas has a vapor pressure equal to from about 10% to about 90% of the total pressure at the normal operating pressure level of said chamber; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

8. A pneumatic load-bearing spring having a gas suspension chamber for a load-supporting gas, said suspension chamber containing under load-induced pressure (1) a condensing gas consisting of 1,2-dichlorotetrafluoroethane; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

9. A pneumatic load-bearing spring having a gas suspension chamber for a load-supporting gas, said suspension chamber containing under load-induced pressure (1) a condensing gas consisting of dichlorodifluoromethane; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

10. A pneumatic load-bearing spring having a gas suspension chamber for a load-supporting gas, said suspension chamber containing under load-induced pressure (1) a condensing gas consisting of monochlorodifluoromethane; (2) a non-condensing gas having a normal gamma value below 1.5 which consists of at least one substantially non-toxic, inert gas which by itself is capable of existing in only the gaseous phase under the operating conditions of temperature and pressure of said chamber and which non-condensing gas is present in an amount to provide that part of the total pressure in said chamber which is in excess of that provided by the condensing gas; and (3) a pool of said condensing gas in liquefied state occupying a minor fraction of the volume of said chamber.

References Cited in the file of this patent

UNITED STATES PATENTS

| | | |
|---|---|---|
| 2,805,854 | Gaebler | Sept. 10, 1957 |
| 2,882,042 | Fleckenstein | Apr. 14, 1959 |